United States Patent [19]

Demeglio

[11] Patent Number: 4,578,854
[45] Date of Patent: Apr. 1, 1986

[54] WALL REPAIR DEVICE AND METHOD
[76] Inventor: John Demeglio, 58 Halley St., Yonkers, N.Y. 10704
[21] Appl. No.: 697,959
[22] Filed: Feb. 4, 1985
[51] Int. Cl.[4] .............................. B23P 6/04; B23P 6/00
[52] U.S. Cl. .................................. 29/402.18; 52/514
[58] Field of Search ....... 29/401.1, 401, 402.1-402.21, 29/530, 527.4; 52/514

[56] References Cited
U.S. PATENT DOCUMENTS
4,460,420  7/1984  Estrada ........................... 29/402.11

*Primary Examiner*—Howard N. Goldberg
*Assistant Examiner*—Vernon K. Rising
*Attorney, Agent, or Firm*—Lackenbach Siegel Marzullo Presta & Aronson

[57] ABSTRACT

The present invention relates to a repair device for planar surfaces, such as drywall panels, wherein the repair of holes in a panel can be performed without a laborious and time-consuming process whereby a portion of the drywall must be removed or the entire drywall panel must be detached from the wall studs and replaced with a new panel. The device comprises a fan like object which opens up to form an umbrella effect, implemented by the use of a rotary mounting arrangement of fan blades which are slidably disposed or mounted about the periphery of a disc. In addition, a tripod-like supporting arrangement is disconnectably connected to the disc for supporting the device against the inner surface of the panel. In use, the device, with the fan in a closed position, is inserted through a hole or opening in the planar surface which requires repair. After insertion, the supporting structure is connected to the disc and thereafter, the fan is opened by sliding the fan blades along the periphery of the disc so as to sufficiently cover the opening from the inside of the hole. The supporting structure is adjusted so as to securely hold the device in place against the inner surface of the planar surface. A filler, such as plaster of paris or other like materials, including ready mix spackling paste is then applied against the exposed portions of the fan and the disc to cover the hole or opening in the planar surface. Once the filler sets, the supporting structure is disconnected from the device, leaving the disc and the fan attached to the inner surface of the panel behind the dried and set plaster or other ready mix paste, thereby repairing the panel.

34 Claims, 5 Drawing Figures

WALL REPAIR DEVICE AND METHOD

BACKGROUND OF THE INVENTION

The present invention relates to a device and/or kit wherein the repair of holes in planar surfaces, more particularly, in drywall panels, can be performed without removal of the entire planar surface from its place of attachment.

Heretofore, the repair of holes in planar surfaces could neither be performed without a laborious and time consuming process whereby a portion of the drywall panel must be removed or the entire panel must be detached from the wall studs and replaced with a new panel. If such a replacement process was not chosen, by virtue of the fact that the hole was too small to require removal or detachment of a portion of the panel or the entire wall panel, the hole had to be filled-in with successive layers of mesh and filler in order to sufficiently build up the repaired surface to a level even with the surface of the remaining drywall panel. The removal of any planar wall surface, no matter how small, from its attachment to the wall studs, frequently leads to damage of the hidden wiring and other unseen structures which are situated behind the planar surface; damage to the surrounding surfaces to which the planar surface is attached such as other drywall panels, and causes an increase in the size of the hole which is being repaired. This increase in the hole's size will increase the structural weakness of the repaired planar surface.

Prior art devices which are concerned with the repair of holes in planar surfaces are exemplified by the following U.S. Patents:

WHITBECK, U.S. Pat. No. 610,594, Sept. 13, 1898
SITZLER, U.S. Pat. No. 2,010,569, Aug. 6, 1935
BLODGETT, U.S. Pat. No. 864,226, Aug. 27, 1907
CIMOCHOWSKI, U.S. Pat. No. 3,156,972, Nov. 17, 1964
WEISSMAN, U.S. Pat. No. 3,049,836, Aug. 21, 1962

U.S. Pat. No 610,594 issued to Whitbeck on Sept. 13, 1898, discloses a device for repairing punctures in bicycle tires wherein a threaded filling and cement are applied to a punctured bicycle tire.

The filling and cement are forced out of a syringe-like implement in order to plug and repair the hole.

U.S. Pat. No. 2,010,569 issued to Sitzler on Aug. 6, 1898, discloses a method for plugging holes in metal plates wherein a plug with a soft metal disc interposed between the plug and the hole is inserted into the hole. The plug is then driven within the plate and the hole is repaired.

U.S. Pat. No. 3,156,972 issued to Cimochowski on Nov. 17, 1964 discloses a method for relining a combustion chamber with refractory material without disassembling the chamber, wherein a corrugated metallic sheet which is rolled upon itself is inserted through an opening in the combustion chamber. Once inside the chamber, the sheet is unrolled to its original configuration and the combustion chamber is relined.

U.S. Pat. No. 3,049,836 issued to Weissman on Aug. 21, 1962 discloses a roofing repair patch device which comprises mastic covered by a membrane having openings therethrough. When the device is inverted and placed over the damaged area and pressure is applied, the mastic will be forced through the membrane so as to adhere the membrane to the roof and thus seal the damaged area.

None of the above-mentioned references show use of a panel repair device in which the repair can be completed entirely from one surface of the panel without the detachment of a portion of the panel or the entire wall panel from its place of attachment to the wall studs.

SUMMARY OF THE INVENTION

It is therefore an object of this invention to provide for a device which is capable of repairing holes in planar surfaces, more particularly, in drywall panels, whereby the repair can be performed and completed entirely from one surface of the panel without the removal of a portion of the panel or the entire planar surface from its place of attachment to the wall studs.

Another object of the invention is to provide for repair of holes of varying sizes in planar surfaces.

Yet another object of the invention to provide for a device which is simple in construction and one which is relatively inexpensive to produce.

DESCRIPTION OF THE PREFERRED EMBODIMENT OF THIS INVENTION

Figure 1:
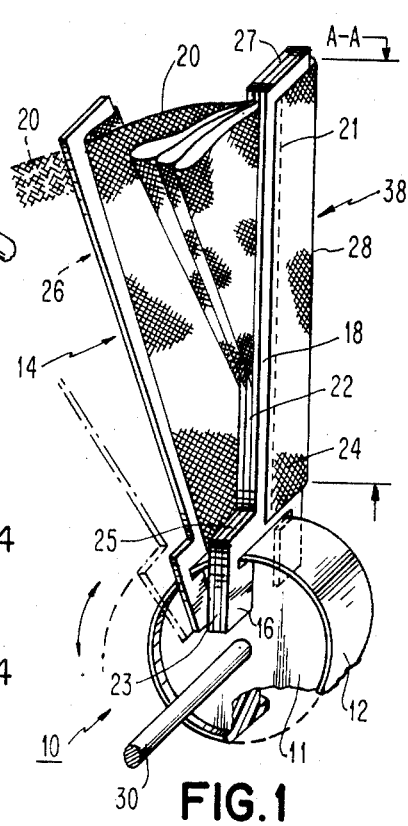
FIG. 1 is a perspective view of the device with the fan in a closed position, and one rib being opened, and with the disc means partially cut away to illustrate its cross-section.

FIG. 1 illustrates a fragmentary perspective view of the device constructed in accordance with the principles of the present invention which embodies a disc or means 10 comprising a circumferential rim portion 12 and a central disc portion 11, whereby a plurality of ribs or rib means 14 with a base portion 16 and a stem portion 18 are cooperatively associated, preferably removably associated, with rim 12. Alternate embodiments of the device can be constructed with the radius of the disc means 10 and the length of the rib means 14 of varying sizes; the combined length corresponding to the size of the hole to be repaired, so that the device will sufficiently cover the diameter of the hole to be repaired in the planar surface 34. The combined length being of a range between one inch to twenty four inches since to repair a hole smaller than one inch requires a conventional "plug" method and to repair a hole larger than 24 inches requires removal of the panel from its place of attachment. The rib means 14 are preferably removably associated with the rim 12, in order to allow the total length of the rib means and the disc means to closely approximate the size of the hole in the wall to be repaired.

The "T-shaped" opening of the base portion 16 conforms to the cross-sectional T-shape of the disc means 10, whereby the rib means 14 is slidably movable along the rim portion 12. A typical position of a rib 14 rotated about the rim portion 12 is shown in phantom.

A piece of mesh-like material 20, preferably arc-shaped and composed of a common flexible material, such as plastic or paper, is suitably attached to the rib means 14. The material 20 is attached to the rib means 14 along longitudinal seam 12 and transverse seam 23. Such attachment may be by any well known means, such as stitching, stapling or gluing, so as to form a plurality of ribs which together as a unit when spread open form a fan-like affect.

The material 20 is suitably wrapped around edge 28 and covers both sides of 24 and 26 of the rib means 14, leaving edge 22 of the stem portion and edges 23 and 25 of the base portion 16 of the rib means 14 exposed. The length of the line of attachment of the material 20 to the rib means 14 is designated by length A-A.

Figure 3:
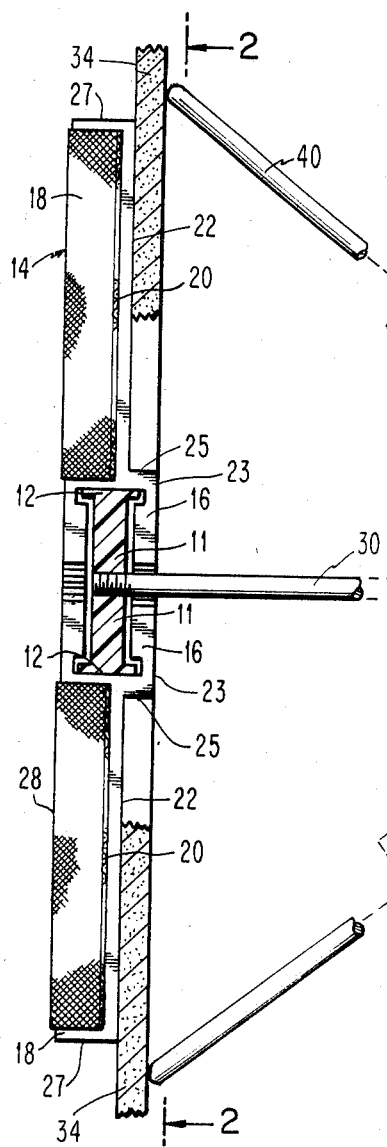
FIG. 3 is a partial cross-sectional view of the device taken along line 3—3 of FIG. 2.
Figure 4:
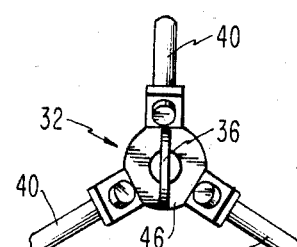
FIG. 4 is a fragmentary plan or end view of the support means taken along line 4—4 of FIG. 3.
Figure 2:
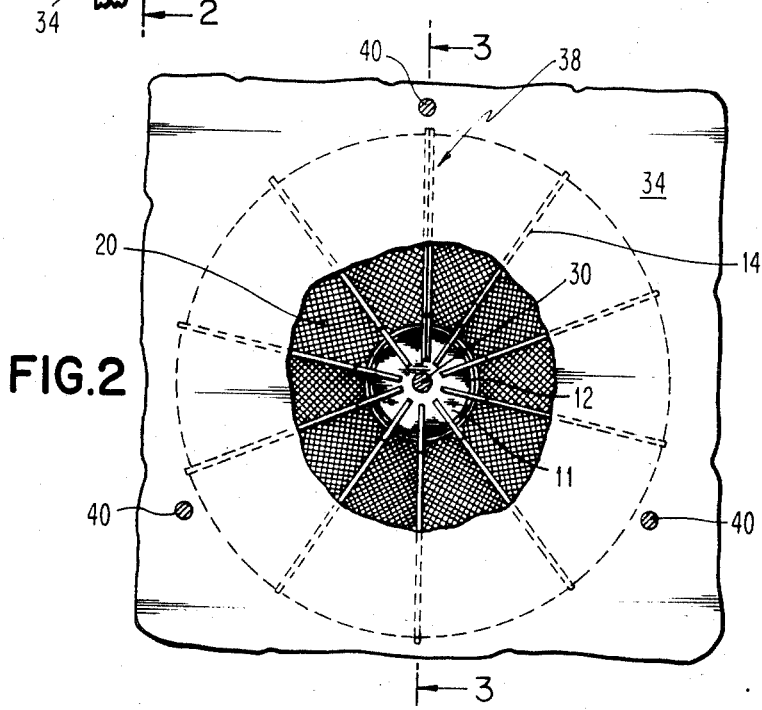
FIG. 2 is a plan view of the device with the legs of the support means forming a tripod symmetrically situated against the outer surface of the planar surface, and showing the rib means in an open position situated behind the planar surface.

As illustrated in FIGS. 1-3, the device with the rib means 14 in a closed position is placed through an opening 25 in the planar surface 34. A supporting rod 30, is then threaded into the threaded bore provided in the central portion of the disc means 10. Such construction provides for support for the device as will be explained in greater detail hereinafter in order that the device will not fall out of the reach of the user once it is placed behind the planar surface 34. The bore is preferably threaded so that the rod 30 is threadedly attached to the disc means 10. Other examples of rod and bore connection may be of a snap-type or even of a slight friction fit. In fact, the rod 30 may even be of a flexible material so long as one can securely fasten the loose end thereof to the "tripod" structure which holds the entire assembly in place as will be explained hereinafter in greater detail.

Once the device is situated behind the planar surface 34, the plurality of rib means 14 are rotatably moved and/or slidably aligned around the rim portion 12 of the disc means 10. This alignment provides for a fan-like affect and a 360 degree full coverage of the space or hole to be repaired. The directional arrow illustrated in FIG. 1, indicates the directions in which the rib means 14 are slidably aligned around the rim portion 12.

The angular fan-like portions range between an obtuse angle of approximately 100 degrees to the full 360 degree position, although the fan-like position may also comprise an acute angle. When obstructions such as well studs, pipes etc. are in close proximity to the surface adjacent to the hole, the full open 360 degree fan-like position cannot be obtained since the rib means 14 abuts these obstructions. Rather, an intermediate or obtuse angle orientation of the fan-like position is formed. A bar means as shown in phantom in FIG. 1, is suitalby secured to the disc means 10, to provide a "stop" for the rib means 14. The two rib means 38 are joined to the bar means by a conventional attachment means such as a clip or pin. The bar means 39 may be slidably aligned around the disc means 10 in order to comform to or approximate the angular orientation of the fan-like position.

In order to obtain the full open 360 degree fan-like position, the two end rib means 38 are slidably aligned along the rim portion 12 and are brought adjacent to each other. When brought together, the end rib means 38 are joined by a conventional attachment means, such as a clip or pin. Other angular fan-like positions apart from the full open fan-like position are contemplated. The two end rib means 38 are dissimilar to the rib means 14 since the end rib means 38 provide for the attachment of the mesh-like material 20 to an adjacent rib means 14 on only one side of the end rib means 38. On the other side of the end rib means 38, which is the side adjacent to the other corresponding end rib means 38, the selvage edge of the mesh-like material 20 is attached along seam 21 with no material situated between the two end rib means 38. The two end rib means 38 are shown joined together with the device in an open position in FIG. 2. The common attachment means is attached to be base portion 16 transverse to edge 23 and parallel to edge 25. Alternatively, the common attachment means is attached transverse to edge 27 and parallel to edge 22 of the stem portion 18. Other positions of attachment are contemplated.

FIG. 2 shows the device in the full 360 degree open position situated behind the planar surface 34. Shown in phantom are the parts of the device which cannot be seen by the user since they are situated behind the planar surface with the device in the full 360 degree open position, the rib means 14 with material 20 therebetween, subtend an angle of approximately a range of about 30 to 45 degrees in arc length. The disc means 10; a portion of the rib means 14; two adjacent end rib means 38 and mesh-like material 20, and supporting means 32 are exposed. Supporting means 32 can be a tripod device, however, other common supportion means can also be employed. The supporting means 32 is adjusted by turning the wing nut 36 which shortens the length of rod 30, which in turn, causes the unexposed parts of the device to tightly abut the inner surface of planar surface 34.

The supporting means consists of a plurality of legs 40 which are suitably attached to a base 46, a central rod 30 which is also suitably attached, preferably threaded attached to the base 46, and a wing nut 36. As shown in FIG. 3, legs 40 are of a suitable construction so that the length of each leg can be adjustable so as to provide sufficient symetrical placement of the legs around the area adjacent to the hole. Examples of this construction may be of a telescopic type, friction fit, snap type or other conventional adjustable construction. Conventional tightening means are employed to fix the legs in position once the proper length is determined.

After disconnectably connected rod 30 is attached, preferably threadedly attached, to the center of disc means 10 on one of its ends, it is subsequently preferably threadedly attached to the base 46 of the supporting means 32 on its opposite end. Legs 40 are summetrically placed around the area adjacent to the hole and the length of legs 40 are adjusted so as to provide sufficient support for the central rod 30 during repair of the wall. Turning the wing nut 36 decreases the length of the rod which, in turn, increases the force which the legs 40 exert against the outer surface of the wall adjacent the hole, which, in turn, forces the unexposed parts of the device against the inner surface of the planar surface 34. This provides for a tight fit of the device against the inner surface of the planar surface which avoids seepage of the plaster between the device and the planar surface and thus creates a smooth affect when the filler dries.

Due to the construction of the device, the device is inserted and securely lodged against the inner surface of the planar surface without having to remove the planar surface from its place of attachment and without distibuting other materials, such as wires or ducts, which are located behind the planar surface.

While the device is held securely in place against the inner surface of planar surface 34, filler is applied against the exposed parts of the device in order to fill the hole. Plaster or other suitable filler is used. The exposed portions of the mesh-like material 20, the rib means 14 and rib means 38 and the disc means 10 provide support for the filler. The base portion 16 is of sufficient length along edge 23 and of sufficient width along edge 25 so as to create a suitable support for the filler material.

Figure 5:
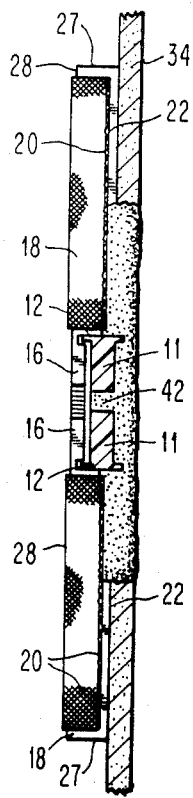
FIG. 5 is a cross-sectional view of the device, similar to FIG. 3, but with the tripod support removed and illustrating the rib means and disc means of the device attached to the inner surface of the planar surface after repair of the planar surface.

As shown in FIG. 5, once the filler sets, the rod 30 is detached from the disc means 10 and the bore formed in the disc means from which the rod 30 was removed is packed with filler. The device remains attached to the inside surface of the planar surface 34. The remaining outside surface of the wall is smoothed over and the planar surface is repaired.

Although the present invention has been described in some detail by way of illustration and example, for purposes of clarity and understanding, it will, of course, be understood that various changes and modifications may be made in the form, details and arrangements of parts without departing from the scope of the invention as set forth in the following claims.

What is claimed is:

1. A device for repairing an opening in a planar surface comprising fan means; disc means; the fan means being slidably mounted to the periphery of the disc means so as to be retractably openable; and supporting means being disconnectably connected with said disc means for supporting the device against the inner surface adjacent the opening of the planar surface; whereby the device, with the fan means being in a closed position, is inserted through the opening of the planar surface and placed behind the planar surface adjacent to the opening, and after insertion, the supporting means is disconnectably connected to the disc means of the device; thereafter, the fan means is opened by sliding the fan means along the periphery of the disc means so as to cover the opening; the supporting means lodging the fan means against the inner surface of the planar surface so that a suitable filler is applied against the fan means and disc means to cover the opening in the planar surface; whereafter setting of the filler, the supporting means is disconnected from the device leaving the disc means and the fan means attached to the inner surface of the planar surface thereby repairing the opening.

2. A device as claimed in claim 1, wherein the disc means further comprises an integrally formed peripheral rim portion and a central hub portion; the peripheral rim portion being circumferentially and integrally attached to the central hub portion.

3. A device as claimed in claim 2, wherein the hub or central portion of the disc means is formed with a bore for connecting or disconnecting the supporting means.

4. A device as claimed in claim 3, wherein the hub portion of the disc means is formed with a threaded bore for connecting or disconnecting the supporting means.

5. A device as claimed in claim 1, wherein the fan means further comprises a plurality of rib portions; fixably attached to the plurality of rib portions and located therebetween is a sheet portion which forms a retractably openable fan.

6. A device as claimed in claim 5, wherein the rib means further comprises an integrally formed stem portion and base portion; the base portion being formed so as to slidably engage the periphery of the disc means.

7. A device as claimed in claim 5, wherein the sheet portion of the fan means is fixably attached to the rib portion by stitching.

8. A device as claimed in claim 5, wherein the sheet portion of the fan means if fixably attached to the rib portion by stapling.

9. A device as claimed in claim 5, wherein the sheet portion is comprised of a mesh-like flexible material.

10. A device as claimed in claim 5, wherein the sheet portion is comprised of plastic.

11. A device as claimed in claim 5, wherein the sheet portion is comprised of paper.

12. A device as claimed in claim 5, wherein the fan means comprises a pair of end rib portions, wherein the end rib portions of the fan means are formed with the sheet portion attached to only one adjacent rib portion, so that the adjacent sides of the two end rib portions are abutting each other when the fan means is brought into an open position.

13. A device as claimed in claim 12, wherein the end rib portions of the fan means are joined to each other by a common attachment means.

14. A device as claimed in claim 13, wherein the common attachment means is a clip.

15. A device as claimed in claim 5, wherein the plurality of rib portions of the fan means with a sheet portion located therebetween subtend an angle of approximately a range of about 30 to 45 degrees in arc length.

16. A device as claimed in claim 1, wherein the support means is a tripod.

17. A device as claimed in claim 16, wherein the tripod further comprises a plurality of legs, the central leg being formed with a threaded end so as to threadedly attach the tripod to the disc means.

18. A device as claimed in claim 1, wherein the device further comprises a bar means for stopping the fan means at predetermined location along the periphery of the disc means.

19. A method for repairing an opening in a planar surface comprising the following steps in the sequence set forth:

(a) inserting a fan means; a disc means, the fan means being slidably mounted to the periphery of the disc means so as to be retractably openable; the fan means being in a closed position through the adjacent opening in the planar surface;

(b) attaching a supporting means to the disc means, the supporting means being cooperatively formed to said disc means for supporting the device against the inner surface of the planar surface;

(c) opening the fan means to the open position by sliding the fan means along the periphery of the disc means so that the disc means and a portion of the fan means are exposed and viewable through the adjacent opening in the planar surface;

(d) adjusting the supporting means to hold the device stationarily in place against the inner surface of the planar surface;

(e) applying filler, to cover the opening in the planar surface as well as to cover the exposed disc means and portion of the fan means; and (f) disconnecting the support means from the disc means once the filler has set; leaving the disc means and a portion of the fan means adhered to the inner surface of the planar surface.

20. A method as claimed in claim 19 further comprising;
 a. applying filler to the bore formed within the disc means by disconnection of the supporting means from the disc means, and
 b. sanding the filler once the filler has set so as to even the surface of the planar surface and repair the hole.

21. A method as claimed in claim 19, wherein the supporting means further comprises a tripod.

22. A method as claimed in claim 21, wherein the central leg of the supporting means comprising a tripod is formed with a threaded end so as to threadedly attach the supporting means to the disc means.

23. A method as claimed in claim 21, wherein the disc means further comprises an integrally formed rim portion and hub portion, the rim portion being circumferentially and integrally formed with the hub portion.

24. A method as claimed in claim 19, wherein the hub portion of the disc means is formed with a bore for threadedly connecting the supporting means.

25. A method as claimed in claim 19, wherein the fan means further comprises a plurality of rib portions; fixably attached to the plurality of rib portions, and located therebetween is a sheet portion which forms a retractably openably fan.

26. A method as claimed in claim 19, wherein the rib means further comprises an integrally formed stem portion and base portion; the base portion being formed so as to slidably engage the periphery of the disc means.

27. A method as claimed in claim 19, wherein the sheet portion of the fan means is fixably attached to the plurality of the rib portions of the fan means.

28. A method as claimed in claim 27, wherein the sheet portion is fixably attached by stitching.

29. A device as claimed in claim 27, wherein the plurality of rib portions of the fan means with the sheet portion located there between subtend an angle of approximately a range of about 30 to 45 degrees in arc length.

30. A method as claimed in claim 19, wherein the sheet portion is comprised of a mesh-like flexible material.

31. A method as claimed in claim 30, wherein the sheet portion is comprised of a plastic.

32. A method as claimed in claim 19, wherein the fan means comprises a pair of end rib portions, wherein the end rib portions are formed with the sheet portion of the fan means attached to only one adjacent rib portion, so that the two adjacent sides of the two rib portions are abutting each other when the fan means is in an open position.

33. A method as claimed in claim 19, wherein the end rib portions of the fan means are attached by a common attachment means.

34. A method as claimed in claim 33, wherein the attachment means is a clip.

* * * * *